United States Patent
Hong et al.

(10) Patent No.: US 7,693,987 B2
(45) Date of Patent: Apr. 6, 2010

(54) SYSTEM USING BACNET VISUAL TEST SHELL FOR MONITORING AND ANALYZING DATA FRAMES ON BACNET MS/TP COMMUNICATION NETWORK

(75) Inventors: Seung Ho Hong, Seoul (KR); Tae Jin Park, Ansan (KR)

(73) Assignees: Industry-University Cooperation Foundation Hanyang University (KR); Kyonggi Provincial Governor (KR)

( * ) Notice: Subject to any disclaimer, the term of this patent is extended or adjusted under 35 U.S.C. 154(b) by 107 days.

(21) Appl. No.: 12/025,159

(22) Filed: Feb. 4, 2008

(65) Prior Publication Data
US 2009/0006611 A1    Jan. 1, 2009

(30) Foreign Application Priority Data
Jun. 28, 2007    (KR) .................. 10-2007-0064538

(51) Int. Cl.
*G06F 15/173* (2006.01)
(52) U.S. Cl. .................. 709/224; 709/223; 709/236
(58) Field of Classification Search ........... 709/224, 709/223, 236; 340/3.51; 713/201; 700/295
See application file for complete search history.

(56) References Cited

U.S. PATENT DOCUMENTS

| | | | | |
|---|---|---|---|---|
| 2002/0156886 | A1* | 10/2002 | Krieski et al. | 709/224 |
| 2002/0174216 | A1* | 11/2002 | Shorey et al. | 709/224 |
| 2004/0034800 | A1* | 2/2004 | Singhal et al. | 713/201 |
| 2005/0076113 | A1* | 4/2005 | Klotz et al. | 709/224 |
| 2006/0184670 | A1* | 8/2006 | Beeson et al. | 709/224 |
| 2007/0069850 | A1* | 3/2007 | Anderson et al. | 340/3.51 |
| 2007/0255461 | A1* | 11/2007 | Brickfield et al. | 700/295 |

* cited by examiner

*Primary Examiner*—Le Luu
(74) *Attorney, Agent, or Firm*—Cantor Colburn LLP (57) ABSTRACT

A BACnet MS/TP communication network analysis system includes: a monitoring node for performing a first filtering on a frame received from the network, configuring a monitoring frame by adding a monitoring frame header to the received frame, and transmitting a frame corresponding to a message created in the BACnet visual test shell (VTS) to the communication network; and a monitoring module for receiving the monitoring frame, performing a second filtering thereon, outputting a result of the second filtering, transmitting a part of the monitoring frame on which the second filtering is performed to the VTS, receiving a message from the VTS, determining a destination address of the network to which the received message is transferred, configuring an MS/TP frame on the basis of the received message and the destination address, and transmitting the configured MS/TP frame to the monitoring node.

19 Claims, 9 Drawing Sheets

SYSTEM USING BACNET VISUAL TEST SHELL FOR MONITORING AND ANALYZING DATA FRAMES ON BACNET MS/TP COMMUNICATION NETWORK

This application claims the benefit of the filing date of Korean Patent Application Nos. 10-2007-0064538 filed on Jun. 28, 2007 in the Korean intellectual Property Office, the disclosure of which is incorporated herein its entirety by reference.

BACKGROUND OF THE INVENTION

1. Field of the Invention

The present invention relates to a communication network analysis apparatus in a multi-layered communication system and a method using the apparatus, and more specifically, to a communication network analysis apparatus in a building automation and control system, a communication method, and a protocol conversion method using the same.

2. Description of the Related Art

A communication network analysis apparatus and a protocol used herein are preferably applied to a building automation and control system. Hereinafter, BACnet will be described as an example of the building automation and control system.

BACnet is an abbreviation of 'A Data Communication Protocol for Building Automation and Control Network', which means a communication protocol for building automation and control adopted as an industry standard in international standard ISO 16484-5 and Korean standard KS X 6909.

As requirements on integrated building automation and control systems are increased recently, instances of application and development of an integrated building management system using BACnet are gradually increased.

BACnet is provided with a plurality of layers including a data link layer.

The BACnet MS/TP protocol, which is one of six data link layer protocols, is a communication protocol dedicated to a data link layer that uses an EIA-485 half-duplex communication method.

A BACnet MS/TP communication network, to which the BACnet MS/TP protocol is applied, is mainly used in a building automation and control system to construct low-cost high-efficiency field communication networks for connecting sensors, actuators, field controllers, building controllers, and the like.

A BACnet visual test shell (VTS), which is a general-purpose BACnet communication test program provided by the BACnet manufacturer association (BMA), is mainly used for BACnet interoperability tests when a BACnet-protocol-based building automation and control apparatus is developed.

A conventional communication network analysis apparatus using a BACnet VTS and a communication method using the communication network analysis apparatus have following problems.

First, there is a problem in that only a unidirectional monitoring function for the BACnet MS/TP protocol is provided. It means that the BACnet VTS provides a sniffing function for the MS/TP frames generated on a BACnet MS/TP communication network. Even though the BACnet VTS can generate and transmit a certain MS/TP frame on a BACnet MS/TP communication network, it is insufficient to perform complicated bidirectional communication interoperability tests.

Second, there is a problem in that the BACnet VTS could not maintain the function of MS/TP master node state machine. Only the BACnet MS/TP master node can voluntarily initiate a service request when the master node holds the token. BACnet VTS is not able to act as a MS/TP master node on the BACnet MS/TP communication network. Therefore, there is a problem in that bidirectional peer-to-peer communication interoperability tests can not be performed.]

SUMMARY OF THE INVENTION

The present invention is conceived to solve the aforementioned problems in the prior art. An objective of the present invention is to provide a communication network analysis apparatus and a method thereof for providing bidirectional communication test functions. Another objective of the present invention is to provide a communication network analysis apparatus and a method thereof for performing a variety of interoperability tests.

According to an aspect of the present invention for achieving the objectives, there is provided a BACnet MS/TP communication network analysis system including at least one BACnet MS/TP node connected to a BACnet MS/TP communication network and a BACnet VTS for monitoring the BACnet MS/TP communication network, the system comprising: a monitoring node for performing a first filtering on a frame received from the BACnet MS/TP communication network, configuring a monitoring frame by adding a monitoring frame header to the frame on which the first filtering is performed, and transmitting a frame corresponding to a message created in the BACnet VTS to the BACnet MS/TP communication network; and a monitoring module for receiving the monitoring frame from the monitoring node, performing a second filtering on the received monitoring frame, outputting a result of the second filtering, transmitting a part of the monitoring frame on which the second filtering is performed to the BACnet VTS, receiving a message from the BACnet VTS, determining a destination address of the BACnet MS/TP communication network to which the received message is transferred, configuring an MS/TP frame on the basis of the received message and the destination address, and transmitting the configured MS/TP frame to the monitoring node.

According to another aspect of the present invention, there is provided a communication network analysis system including at least one data link layer node connected to a token-passing based communication network and a VTS for monitoring the token-passing based communication network, the system comprising: a monitoring node for performing bidirectional communication with the communication network in the unit of a frame containing a protocol data unit (PDU) used in an upper layer including a network layer and a header used in a data link layer, performing a first filtering on a frame received from the communication network, configuring a monitoring frame by inserting information on a time when the frame is received, and transmitting a frame corresponding to a message created by the BACnet VTS to the communication network; and a monitoring module for receiving the monitoring frame from the monitoring node, performing a second filtering on the received monitoring frame, transmitting a part of the monitoring frame on which the second filtering is performed to the VTS, configuring a frame containing a PDU contained in a message received from the VTS and a header to which a destination address to which the received PDU is transmitted is added, and transmitting the configured frame to the monitoring node.

Preferably, the first filtering is performed in the data link layer.

Preferably, the first filtering is performed in accordance with a type of the frame received from the communication network.

Preferably, the second filtering is performed in the upper layer.

Preferably, the second filtering is performed in accordance with an application protocol data unit (APDU) and an application service of the received monitoring frame.

Preferably, the monitoring module transmits monitoring set data for controlling settings of the monitoring node.

DESCRIPTION OF THE PREFERRED EMBODIMENT

Hereinafter, specific features and effects of the present invention will be implemented by an embodiment of the present invention described below. Throughout the drawings, like reference numerals are used to designate like elements.

Although an embodiment of the present invention can be applied to a variety of communication networks having a VTS and a data link layer, hereinafter, an example of the a communication network analysis apparatus applied to the BACnet specification (ANSI/ASHRAE standard 135-2004, A Data Communication Protocol for Building Automation and Control Networks, Oct. 3, 2004) will be described for convenience of explanation. Since terms of network entities and data frames used in the following embodiment can be modified, the specific terms used in following embodiment will not limit the present invention).

The communication network analysis apparatus according this embodiment is an apparatus capable of performing bidirectional communication tests for creating and transmitting an arbitrary message and confirming a response to the message. In addition, the apparatus according to this embodiment is an apparatus for providing functions of analyzing and selectively filtering MS/TP frames.

Figure 1:
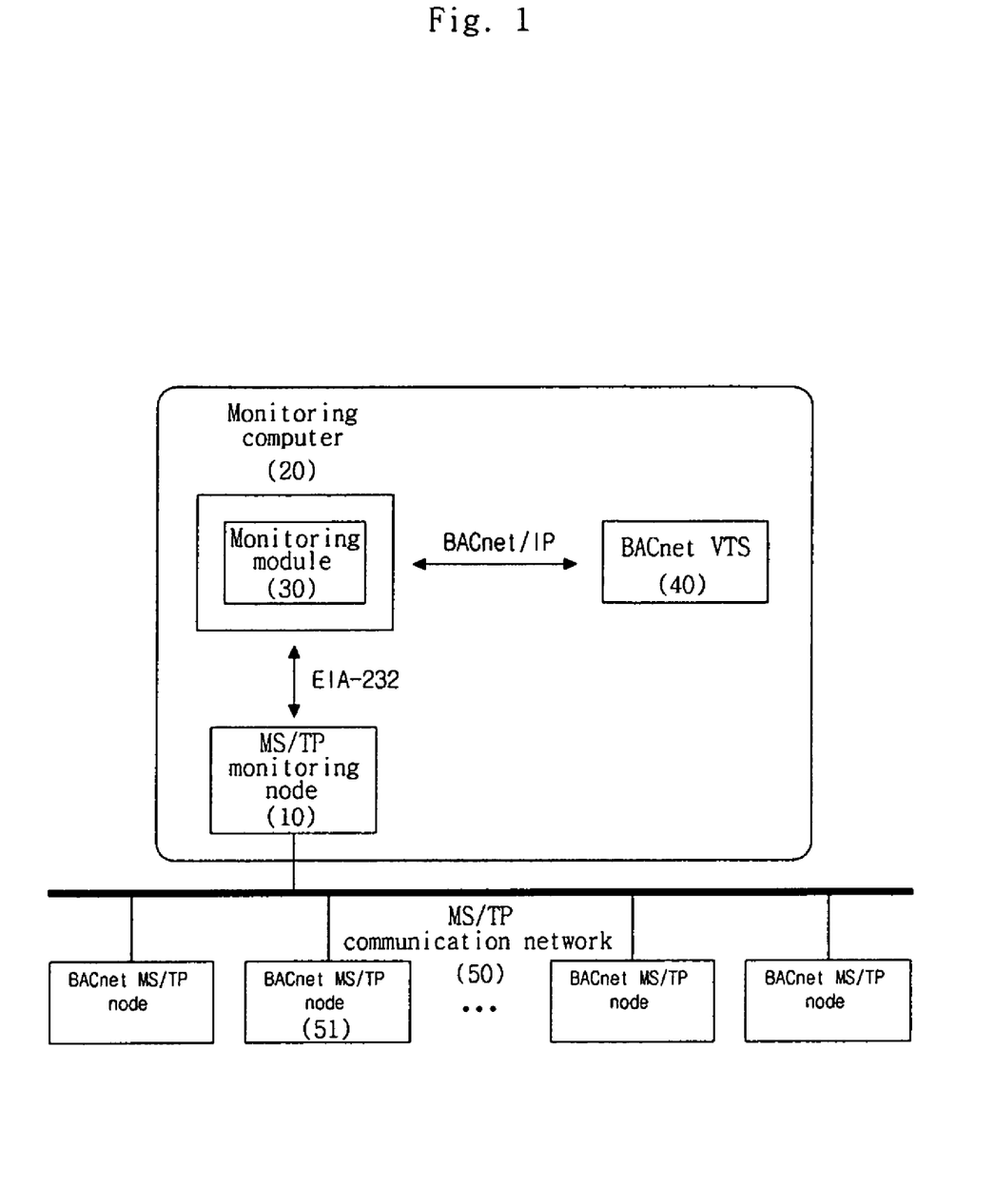
FIG. 1 is a block diagram showing a communication network analysis apparatus capable of performing bidirectional communication tests.

FIG. 1 is a block diagram showing a communication network analysis apparatus capable of performing bidirectional communication tests. Hereinafter, the communication network analysis apparatus according to this embodiment will be described referring to FIG. 1.

This embodiment proposes a communication network analysis apparatus capable of performing bidirectional communication tests through an MS/TP monitoring node 10 and a monitoring module 30.

The system according to the example of FIG. 1 comprises a BACnet VTS 40, a monitoring module 30 implemented in a monitoring computer 20, an MS/TP monitoring node 10, an MS/TP communication network 50 to which the MS/TP monitoring node 10 is connected, and at least one BACnet MS/TP node 51 connected to the MS/TP communication network 50.

The MS/TP monitoring node 10 according to the example of FIG. 1 can transmit an arbitrary message to the MS/TP communication network 50 after receiving a token from the MS/TP communication network 50. That is, the MS/TP monitoring node 10 receiving the token operates as a BACnet MS/TP master node. In addition, the MS/TP monitoring node 10 receives and analyzes an MS/TP frame transmitted from the MS/TP communication network 50 while transmitting the arbitrary message. An analyzing method performed in the MS/TP monitoring node 10 will be described below in detail with reference to FIG. 3 and the like.

The monitoring module 30 according to the example of FIG. 1 displays analysis information on the MS/TP frame received from the MS/TP monitoring node 10 on a screen, and if necessary, converts the received MS/TP frame into the BACnet/IP message to transmit the converted MS/TP frame to the BACnet VTS 40. In addition, the monitoring module 30 can convert a message received from the BACnet VTS 40 into a BACnet MS/TP frame and then transmit the converted MS/TP frame to the MS/TP monitoring node 10.

An interface of a full-duplex communication mode is preferably supported between the monitoring module 30 and the MS/TP monitoring node 10. Any kind of full-duplex communication mode can be used, but among a variety of full-duplex, communication modes, the specification of EIA-232 (Electrical Industry Association 232) is used in the example shown in FIG. 1.

The MS/TP monitoring node 10 can be referred to as a variety of terms, such as 'monitoring node', 'surveillance node', and the like. In addition, the monitoring module 30 can be implemented in hardware or software. If the monitoring module 30 is implemented in software, it can be referred to as a variety of terms, such as 'software module', 'monitoring software', and the like. In addition, if the monitoring module 30 is implemented in hardware, it can be installed in the monitoring computer 20 shown in FIG. 1.

Figure 2:
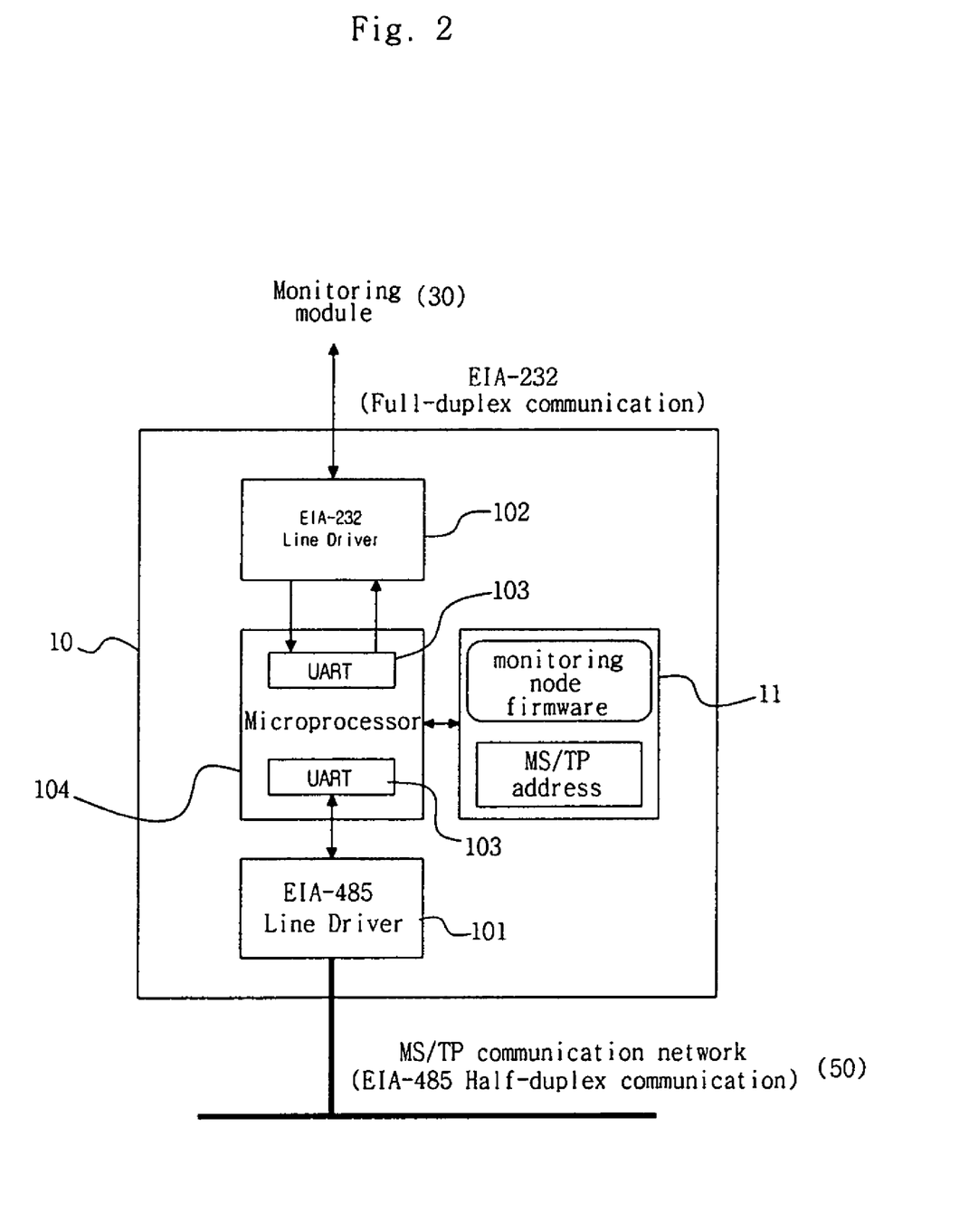
FIG. 2 is a view illustrating a structure of an MS/TP monitoring node.

FIG. 2 is a view illustrating the structure of the MS/TP monitoring node 10. As shown in the figure, the MS/TP monitoring node 10 communicates with the MS/TP communication network 50 of a half-duplex mode through an EIA-485 line driver 101. In addition, the MS/TP monitoring node 10 is connected to the MS/TP communication network 50 through a microprocessor 104 having two universal asynchronous receivers and transmitters (UARTs) 103. In addition, the MS/TP monitoring node 10 communicates with the monitoring module 30 in the EIA-232 mode through either of the UARTs 103.

While operating as an MS/TP master node in the MS/TP communication network 50, the MS/TP monitoring node 10 can transmit an MS/TP frame received from the monitoring module 30 to the MS/TP communication network 50. Since the MS/TP monitoring node 10 should have an address on the space of the MS/TP communication network 50 in order to transmit data to the MS/TP communication network 50, an address between 0 and 127 is allocated to the MS/TP monitoring node 10 through an MS/TP address switch.

In addition, while operating as an MS/TP master node, the MS/TP monitoring node 10 receives, analyzes, and monitors all MS/TP frames generated from the MS/TP communication network 50. It is further preferable to perform such an analysis and monitoring operation through monitoring node firmware 11 contained in the MS/TP monitoring node 10.

Hereinafter, referring to FIGS. 3 and 4, the operation of the monitoring node firmware 11 contained in the MS/TP monitoring node 10 will be described.

Figure 3:
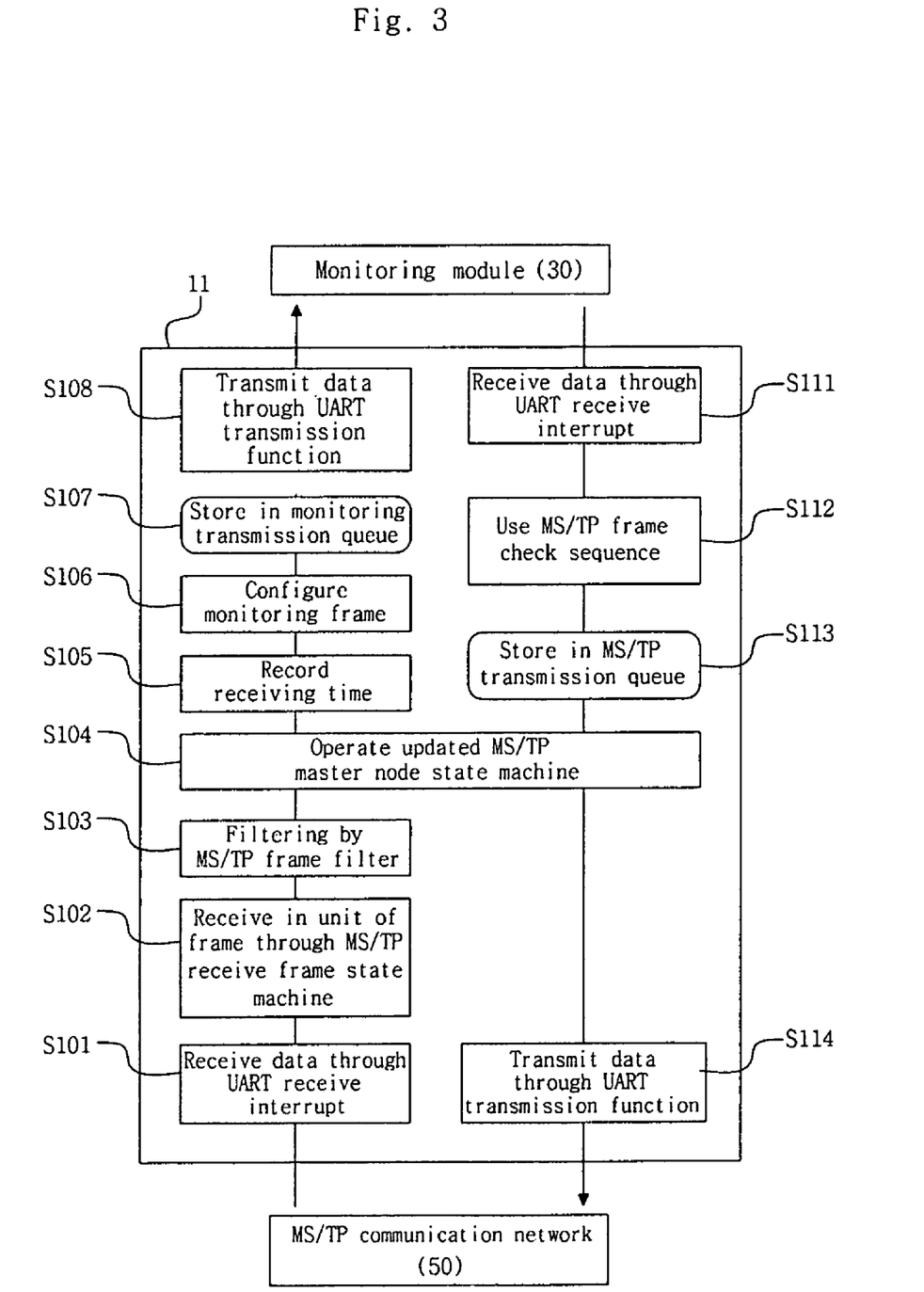
FIG. 3 is a block diagram showing the operation performed in a monitoring node firmware 11.

FIG. 3 is a block diagram showing the operation performed in the monitoring node firmware 11. As shown in the figure, the monitoring node firmware 11 acquires data received from the MS/TP communication network 50 through an UART receive interrupt (step S101). The data received through the UART is received through an MS/TP receive frame state machine in the unit of an MS/TP frame (step S102). The received MS/TP frame is filtered by an MS/TP frame filter (step S103). An example of a specific operation of step S103 is described with reference to FIG. 4. The MS/TP frame filtered in step S103 is processed by means of a modified MS/TP master node state machine (step S104).

The modified MS/TP master node state machine used in step S104 is a modification of the MS/TP master node state machine described in chapter 9.5.6 of ANSI/ASHRAE Standard 135-2004 (ANSI/ASHRAE standard 135-2004, A Data Communication Protocol for Building Automation and Control Networks, Oct. 3, 2004), which is a specification related to BACnet. The MS/TP master node state machine proposed in the existing specification is designed to receive only MS/TP frames broadcasted on the MS/TP communication network 50 or transmitted to the MS/TP master node state machine itself. However, since the communication network analysis apparatus according to this embodiment preferably analyzes all frames of the MS/TP communication network 50, it is preferable to modify and use the MS/TP master node state machine used in the existing specification. That is, it is preferable to implement an MS/TP master node state machine modified by deleting a part where the address of an MS/TP frame is compared from the conditions of 'ReceiveDataNoReply' transition and 'ReceiveDataNeedingReply' transition performed in the MS/TP master node state machine.

The MS/TP frame received through step S104 is configured as a monitoring frame through step S106. In this case, a receiving time of the MS/TP frame is preferably recorded in the monitoring frame (step S105), and the receiving time is further preferably contained in the monitoring frame header. As a result, the monitoring frame is configured by inserting the monitoring frame header into the MS/TP frame, and the monitoring frame header contains information on the receiving time or the like.

The monitoring frame configured through steps S104 to S106 is transmitted to the monitoring module 30 by a monitoring transmission queue and an UART transmission function (steps S107 and S108).

If data is received from the monitoring module 30, the monitoring node firmware 11 acquires the data by an CART receive interrupt (step S111). In addition, an MS/TP frame is received through an EIA-232 interface by an MS/TP frame check sequence (step S112), and the received MS/TP frame is stored in the MS/TP transmission queue (step S113). The stored MS/TP frame is transmitted to the MS/TP communication network 50 by the modified MS/TP master node state machine (step S114).

Figure 4:
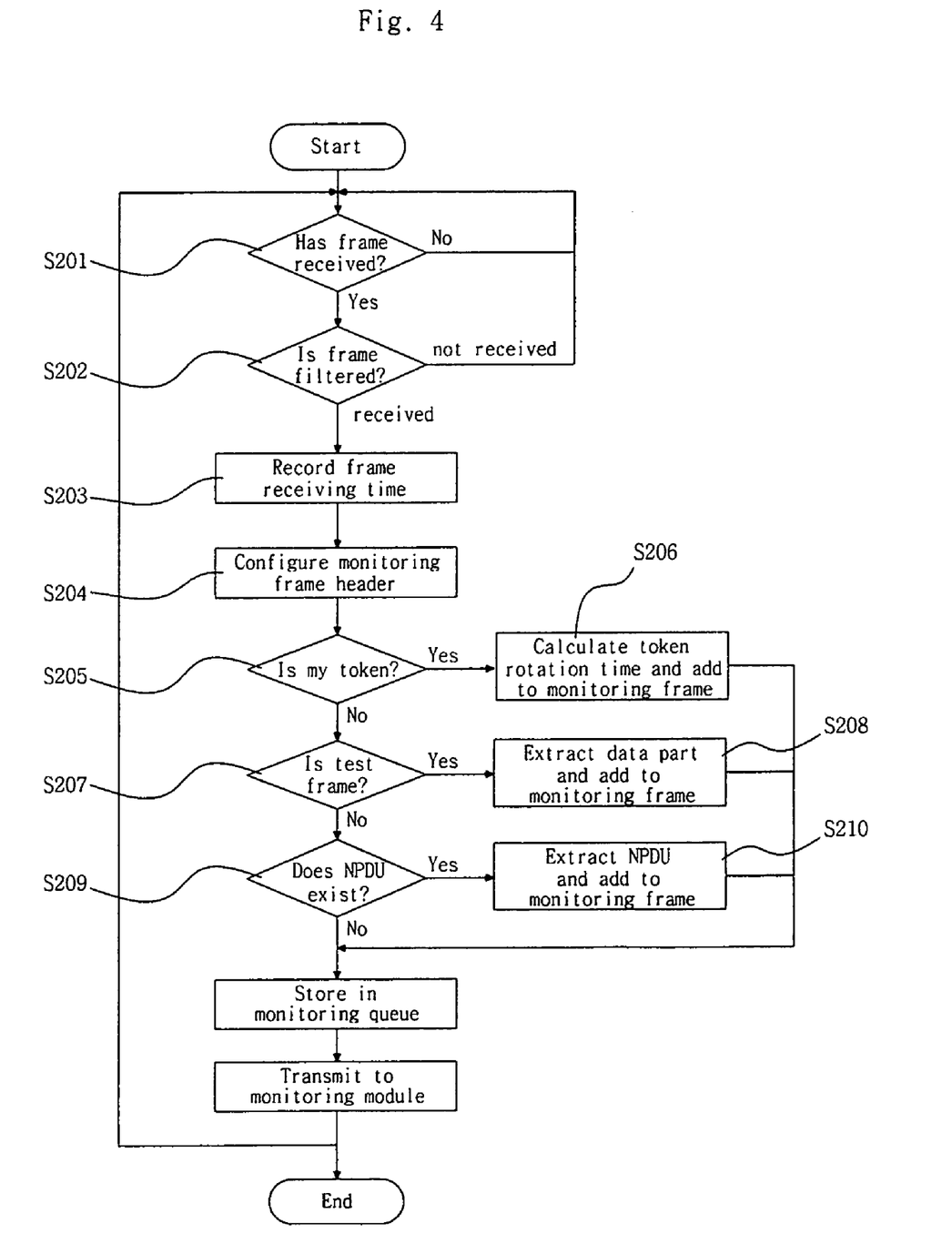
FIG. 4 is a flowchart illustrating the operation related to filtering operation of MS/TP frames to configuring operation of a monitoring frame, which are performed in the monitoring node firmware.

FIG. 4 is a flowchart illustrating the operation related to step S103 to step S106, which are performed in the monitoring node firmware 11. Hereinafter, the operation of the monitoring node firmware 11 will be described referring to FIG. 4.

A frame is received by the modified MS/TP master node state machine and the MS/TP receive frame state machine (step S201). Filtering is performed on the received frame (step S202). The filtering operation is a selective filtering, in which unless the type of a frame is predetermined, the frame is filtered and data is not received. MS/TP frame types conforming to the BACnet specification and the functions of the respective frame types are shown in Table 1.

TABLE 1

| MS/TP frame type | Function |
|---|---|
| Token | Transfer media access right |
| Poll for Master | Poll for master node |
| Reply to Poll for Master (Reply FPM) | Reply to 'Poll for Master frame' |
| Test_Request | Request function for loop-back test |
| Test_Response | Response function for loop-back test |
| BACnet Data Expecting Reply (BACnet DNER) | Data transmission expecting reply |
| BACnet Data Not Expecting Reply (BACnet DNER) | Data transmission not expecting reply |
| Reply Postponed | Postpone reply for received request |

If the frame is filtered and received in step S202, a receiving time of the MS/TP frame is recorded (step S203). Since a correct receiving time is needed to effectively monitor and analyze the MS/TP frame, the monitoring node's receiving time of the MS/TP frame is recorded in the monitoring frame.

As described above, the monitoring node firmware 11 configures a monitoring frame by inserting a monitoring frame header (step S204). The monitoring frame header is configured in steps S205 to S210. In an example of configuring a monitoring frame described below, types of filtered and received frames are 'Token', 'Test_Request', 'Test_Response', 'BACnetDER', and 'BACnetDNER' in Table 1. The types of MS/TP frames to be filtered can be separately determined, and steps S205 to S210 also can be separately determined depending on the types of MS/TP frames to be filtered.

If the filtered frame is a token frame corresponding to the address of the MS/TP monitoring node 10 (step S205), a token rotation time is calculated and stored in the monitoring frame header (step S206).

If the received MS/TP frame is a 'Test_Request' or 'Test_Response' frame of Table 1 (step S207), only the test data part, excluding the MS/TP header, is extracted and stored in the monitoring frame header (step S208). The 'Test_Request' and 'Test_Response' frames are used for a communication echo test in a BACnet system. Further specifically, the 'Test_Request' and 'Test_Response' frames do not contain an APDU (Application PDU) and an NPDU (Network PDU), and after only the aforementioned test data part is transmitted, it is confirmed whether the same test data part is received as a response.

If the received frame is a 'BACnet_DER' frame or a 'BACnet_DNER' frame containing an NPDU (step S209), only the NPDU part is extracted and stored in the monitoring frame (step S210). Since the BACnet_DER' or 'BACnet_DNER' frame is transmitted to the BACnet VTS 40 and monitored, it is preferable that the NPDU part is extracted and stored in the monitoring frame in advance and then the NPDU part can be transmitted to the BACnet VTS 40 at a later time.

In the case of the other MS/TP frames, only a monitoring frame header is added to the MS/TP frame header, and the MS/TP frames are stored in a monitoring queue and transmitted to the monitoring module 30.

The apparatus according to this embodiment provides two filtering steps, and the filtering process described above corresponds to the first filtering of the two filtering steps. The first filtering is a data link layer filtering performed on a frame received from the MS/TP communication network. On the other hand, the second filtering is an application layer filtering of the BACnet and will be described referring to FIG. 5.

Figure 5:
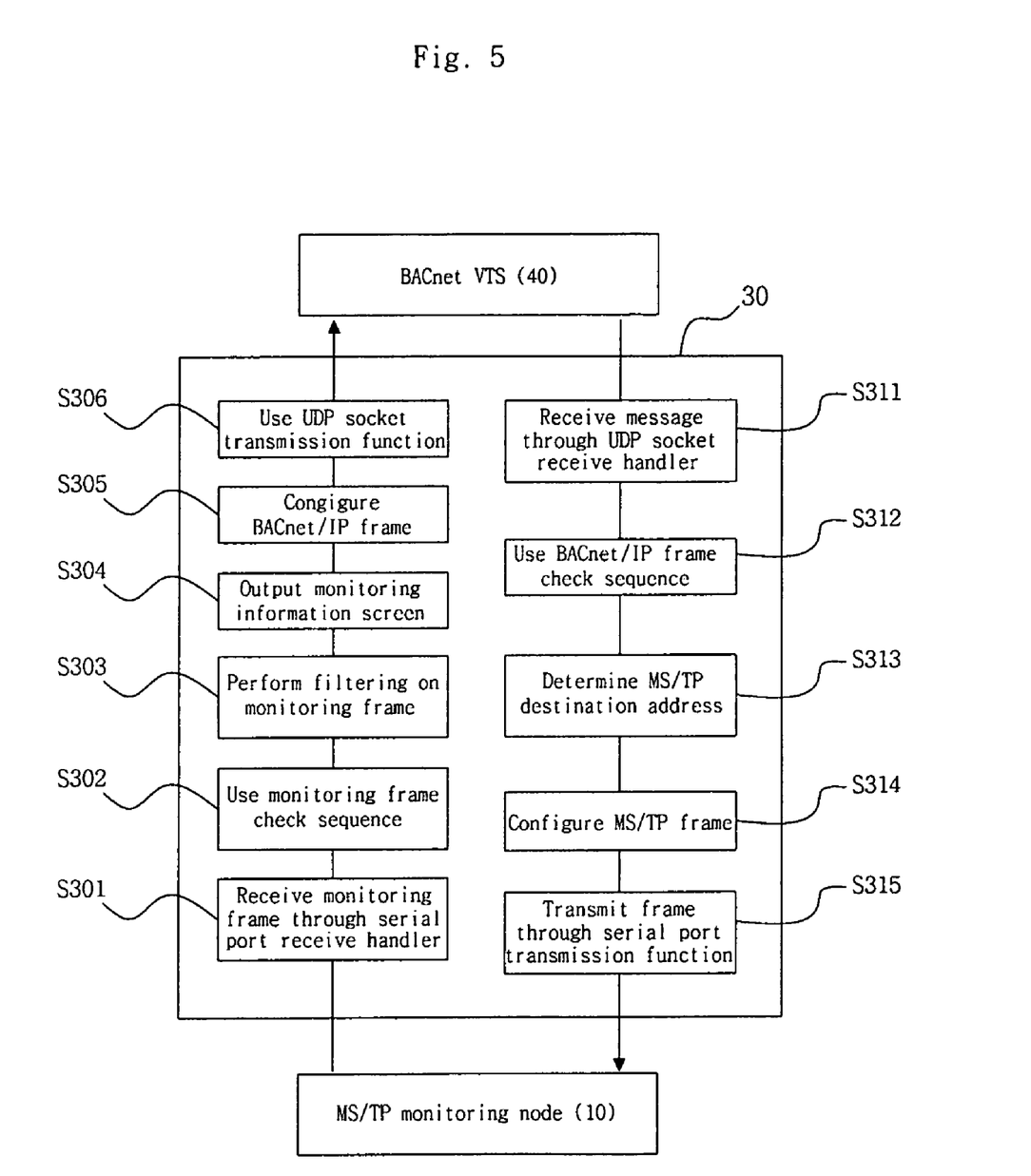
FIG. 5 is a block diagram illustrating the monitoring and filtering operation performed in a monitoring module.

FIG. 5 is a block diagram illustrating the monitoring and filtering operation performed in the monitoring module 30. Hereinafter, the monitoring and filtering operation will be described based on of the monitoring module 30 that is driven on the basis of computer software.

The monitoring module 30 of FIG. 5 receives a monitoring frame from the monitoring node through a serial port receive handler (step S301). After passing through a monitoring frame check sequence (step S302), the received monitoring frame is filtered (step S303). The filtering of step S303 is performed depending on the BACnet application service and the type of the BACnet APDU contained in the received frame. Further specifically, the monitoring module 30 analyzes the NPDU and APDU part of the received monitoring frame and performs filtering on a specific BACnet APDU or BACnet application service. The types and functions of BACnet APDUs are shown in Table 2.

TABLE 2

| BACnet APDU type | Function |
| --- | --- |
| ConfirmedRequest | Transmit service request expecting reply |
| UnconfirmedRequest | Transmit service request not expecting reply |
| SimpleACK | Transmit reply not containing data |
| ComplexACK | Transmit reply containing data |
| SegmentACK | Transmit segmented reply |
| Error | Transmit service error |
| Reject | Transmit service reject |
| Abort | Transmit service abort |

In addition, the BACnet application layer services and functions provided thereto are shown in Table 3.

TABLE 3

| BACnet application layer service | Provided functions |
| --- | --- |
| AcknowledgeAlarm | User recognizes alarm |
| ConfirmedCOVNotification | COV notification service expecting confirmation |
| UnconfirmedCOVNotification | COV notification service not expecting confirmation |
| ConfirmedEventNotification | Event notification service expecting confirmation |
| UnconfirmedEventNotification | Event notification service not expecting confirmation |
| GetAlarmSummary | Request alarm summary |
| GetEnrollmentSummary | Request currently enrolled event descriptions |
| GetEventInformation | Request information on event settings |
| LifeSafetyOperation | Perform function required for fire or disaster |
| SubscribeCOV | Register COV subscription to relevant object |
| SubscribeCOVProperty | Register COV subscription to property of relevant object |
| AtomicReadFile | File read service |
| AtomicWriteFile | File write service |
| AddListElement | Add relevant item to list |
| RemoveListElement | Remove relevant item from list |
| CreateObject | Create dynamic object |
| DeleteObject | Delete dynamic object |
| ReadProperty | Read property of relevant object |
| ReadPropertyConditional | Conditionally read property of relevant object |
| ReadPropertyMultiple | Read multiple properties |
| ReadRange | Read specified range from list or array |

TABLE 3-continued

| BACnet application layer service | Provided functions |
| --- | --- |
| WriteProperty | Write value to property |
| WritePropertyMultiple | Write values to multiple properties |
| DeviceCommunicationControl | Control communication state of equipment |
| ConfirmedPrivateTransfer | Transmit private data not conforming to specification (Confirmed) |
| UnconfirmedPrivateTransfer | Transmit private data not conforming to specification (Unconfirmed) |
| TimeSynchronization | Synchronize time |
| UTCTimeSynchronization | Synchronize time using universal time coordinated |
| Who-Has/I-Have | Search for equipment possessing object |
| Who-Is/I-Am | Search for and recognize BACnet equipment |
| VT-Open | Open virtual terminal |
| VT-Close | Close virtual terminal |
| VT-Data | Transmit data through virtual terminal |

After filtering is performed in step S303, monitoring information is output through a screen or the like of a computer mounted with the monitoring module 30 (step S304). The monitoring information output in step S304 is preferably monitoring information on all the frames received in step S302. An example of an output monitoring result is shown in FIG. 6.

Figure 6:
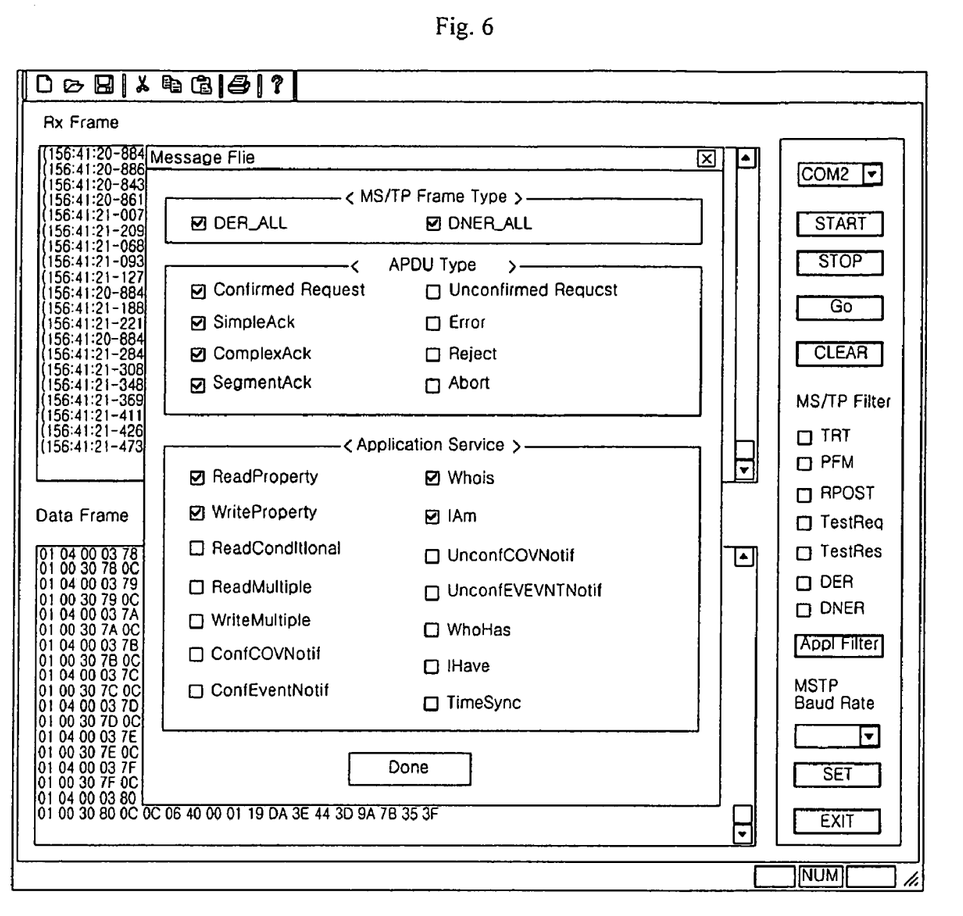
FIG. 6 is an example of monitoring information displayed on an external display apparatus by the monitoring module.

As shown in FIG. 6, the monitoring module 30 can filter APDUs of 'ConfirmedRequest', 'SimpleACK', 'ComplexACK', and 'SegmentACK' types and services of 'ReadProperty', 'WriteProperty', and 'Who-Is/I-Am' types. In this case, the result of the filtering is displayed in the 'Rx Frame' field shown in FIG. 6. The displayed monitoring information includes a receiving time of a corresponding frame, MS/TP frame type, frame length, whether the frame is filtered, and the like.

A frame containing an NPDU among the frames filtered and received in step S303 is transmitted to the BACnet VTS 40. Since the type of the frame containing an NPDU is 'BACnet_DER' or 'BACnet_DNER', the NPDU part of the 'BACnet_DER' or 'BACnet_DNER' frame is contained in a BACnet/IP frame transmitted to the BACnet VTS 40 (step S305). The frame on which step S305 has been performed is transmitted to the BACnet VTS 40 after a user datagram protocol (UDP) socket is added (step S306).

The monitoring module 30 can receive a message from the BACnet VTS 40 and transmit data to the MS/TP monitoring node 10. In this case, the monitoring module 30 performs a BACnet/IP frame check sequence in order to receive the BACnet/IP message through a UDP socket receive handler (steps S311 and S312). In the meantime, the message received from the BACnet VTS 40 does not contain information on a node in the MS/TP communication network to which the corresponding message should be transmitted. Accordingly, the monitoring module 30 according to this embodiment preferably determines an MS/TP destination address to which the corresponding message is transmitted (step S313). If the destination address is determined in step S313, after the destination address is inserted into the MS/TP frame header and an MS/TP frame is configured, the corresponding MS/TP frame is transmitted to the MS/TP monitoring node 10 through a serial port transmission function (steps S314 and S315).

The structure of the frame created in step S305 or S314 of FIG. 5 will be described in further detail referring to FIGS. 7 and 8.

Figure 7:
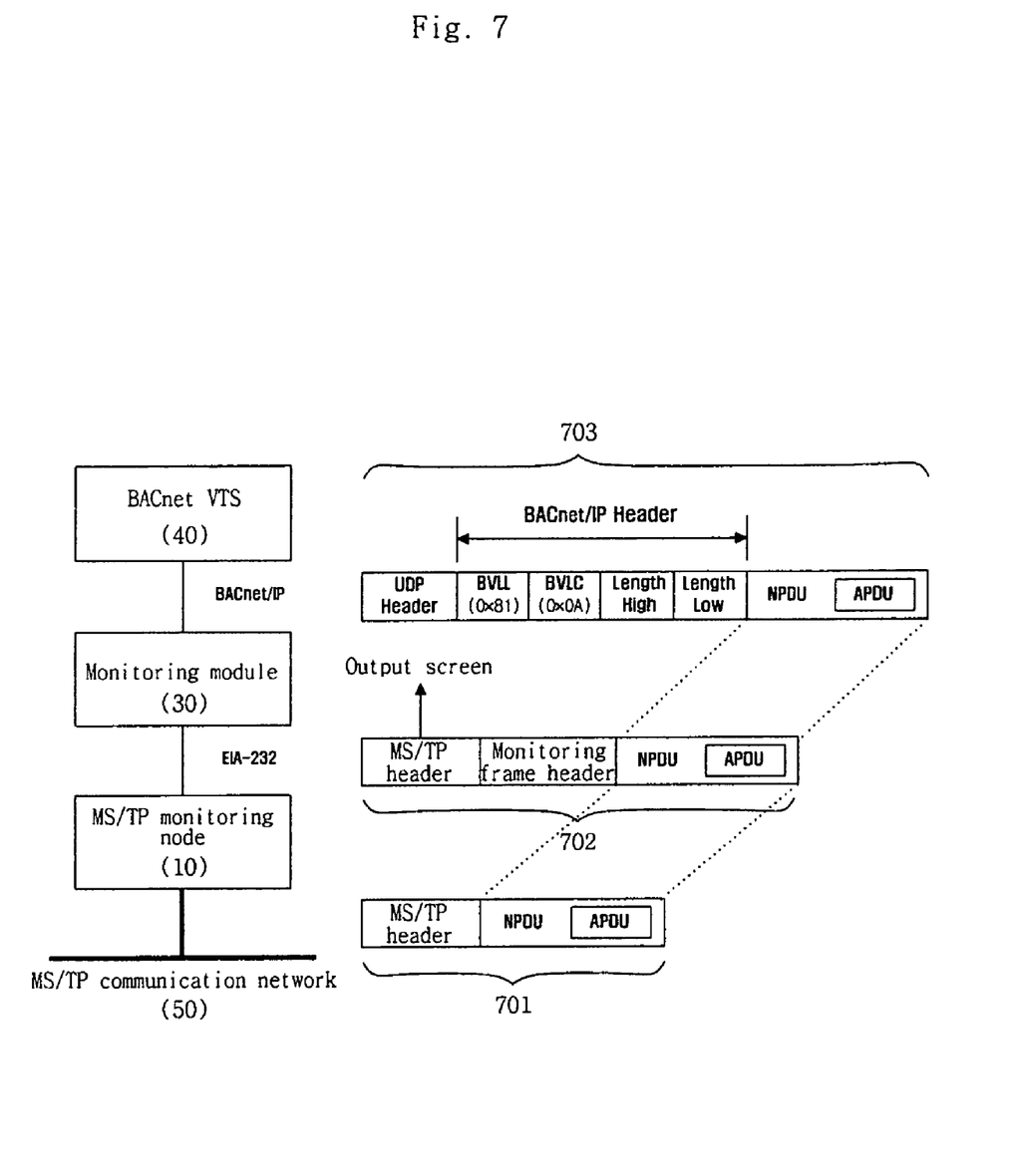
FIGS. 7 and 8 are block diagrams showing structures of respective frames used for bidirectional data transmission according to an embodiment of the present invention.
Figure 8:
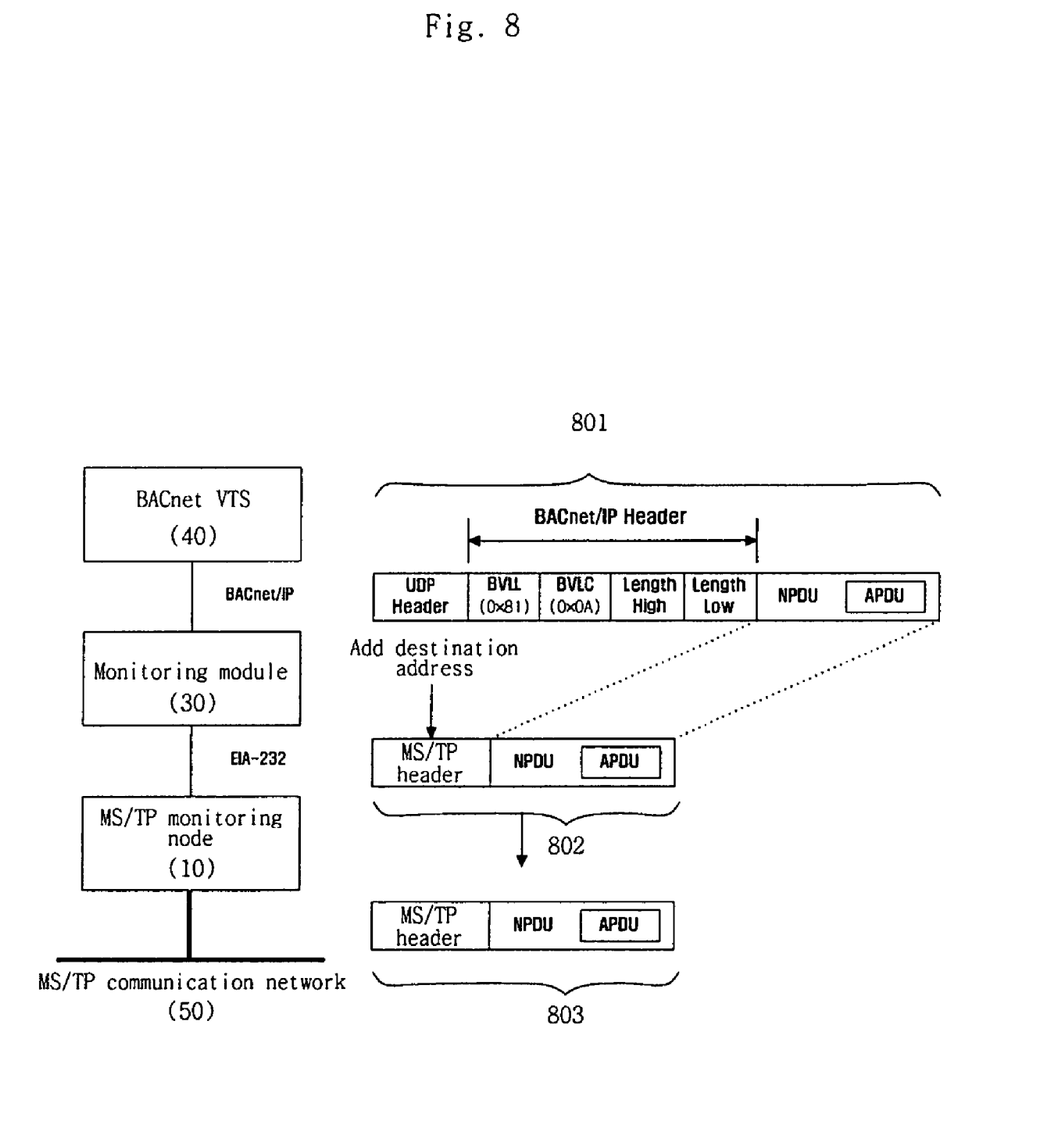

FIGS. 7 and 8 are block diagrams showing structures of the respective frames used for bidirectional data transmission according to an embodiment of the present invention.

FIG. 7 shows the communication performed in a direction of the BACnet VTS 40 from the MS/TP communication network 50, and a frame 701 shown in the figure is an MS/TP frame that the MS/TP monitoring node 10 receives from the MS/TP communication network 50. As shown in the figure, the frame 701 contains an MS/TP header, together with an NPDU used in the network layer and an APDU used in the application layer.

The MS/TP monitoring node 10 configures a monitoring frame through the first filtering described in FIGS. 3 and 4 and the like. The monitoring frame 702 according to this embodiment additionally contains a monitoring frame header. As described above, the monitoring frame header contains a variety of information including receiving time information.

The monitoring module 30 configures the BACnet/IP frame 703 by performing the second filtering on the monitoring frame 702. The NPDU and APDU contained in the BACnet/IP frame 703 are the NPDU and APDU contained in the monitoring frame 702. A UDP header and a BACnet/IP header are added to the BACnet/IP frame 703 through steps S305 and S306 of FIG. 5. The detailed configuration of the BACnet virtual link layer (BVLL), BACnet virtual link control (BVLC), or the like contained in the BACnet/IP header is specified in detail in 'Annex J of ANSI/ASHRAE Standard 135-2004' or the like, which is a specification related to BACnet.

After performing the second filtering, the monitoring module 30 can output monitoring information on the screen as shown in FIG. 6 on the basis of the monitoring frame header and the MS/TP header contained in the monitoring frame 702.

FIG. 8 shows a communication performed in a direction of the MS/TP communication network 50 from the BACnet VTS 40, and the monitoring module 30 receives the shown BACnet/IP frame 801. The monitoring module 30 determines an MS/TP destination address through steps S313 and S314 and performs operation for configuring the MS/TP frame 802.

The MS/TP frame 802 is transmitted to the MS/TP communication network 50 after being transferred to the monitoring node 10. In this case, it is preferable that the MS/TP frame 802 received by the monitoring node 10 is directly transmitted to the MS/TP communication network 50 without data conversion.

The system of FIGS. 1 to 8 is an example for implementing the MS/TP monitoring node 10 and the monitoring module 30 as separate units. However, in order to easily implement the system, the MS/TP monitoring node 10 and the monitoring module 30 can be integrated in a single unit or separated into three or more units.

A variety of settings of the aforementioned MS/TP monitoring node 10 (e.g., communication speed of the monitoring node or the like) can be controlled by the monitoring module 30.

Figure 9:
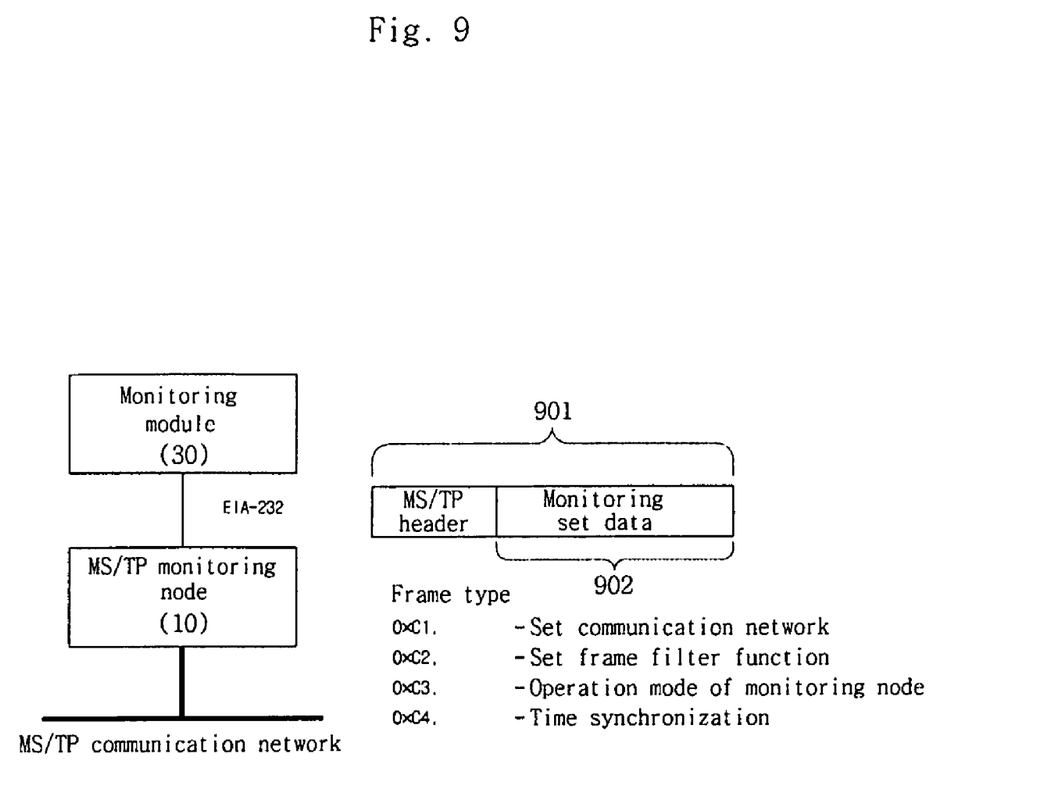
FIG. 9 is a block diagram illustrating an example of a method for controlling a variety of settings of the MS/TP monitoring node 10 through the monitoring module.

FIG. 9 is a block diagram illustrating an example of a method for controlling a variety of settings of the MS/TP monitoring node 10 through the monitoring module 30.

If the monitoring module 30 is monitoring software implemented in a computer, a user can control a variety of settings of the MS/TP monitoring node 10 with simple handlings. The set frame 901 shown in FIG. 9 is a frame transmitted to control the settings of the MS/TP monitoring node 10.

As shown in FIG. 9, four types of settings can be performed to set a communication speed, a frame filter function, an operation mode, and time synchronization of the MS/TP monitoring node 10. Since the set frame 901 proposed in this embodiment should be distinguished from conventional MS/TP frames, the set frame 901 is preferably configured using a frame type that has not been used for the conventional MS/TP frames. For example, the four types of settings can be performed through the codes of '0xC1', '0xC2', '0xC3', and '0xC4' that are not used in the MS/TP protocol.

The four types of codes (0xC1, 0xC2, 0xC3, and 0xC4) used in FIG. 9 are preferably used as shown in Table 4.

TABLE 4

| Set function | MS/TP header (Hex) | Data field | |
|---|---|---|---|
| Set communication speed | 55, FF, C1, FF, FF, 01, CRC | Baud Rate (1 Byte)<br>0x00 = 9600 bps<br>0x01 = 19200 bps<br>0x02 = 38400 bps<br>0x03 = 76800 bps | |
| Set MS/TP frame filter | 55, FF, C2, FF, FF, 02, CRC | Mode (1 Byte)<br>0x00 = Token<br>0x01 = Poll for Master<br>0x02 = Reply FPM<br>0x03 = Test_Request<br>0x04 = Test_Response<br>0x05 = BACnetDER<br>0x06 = BACnetDNER<br>0x07 = ReplyPostPoned<br>0xFF = Reset | Value (1 Byte)<br>0x00 = Disable<br>0x01 = Enable |
| Set operation mode of monitoring node | 55, FF, C3, FF, FF, 02, CRC | Mode (1 Byte)<br>0x00 = Debugging<br>0x01 = Communication function<br>0xFF = Reset | Value (1 Byte)<br>0x00 = Disable<br>0x01 = Enable |
| Set time synchronization | 55, FF, C4, FF, FF, 0A, CRC | Year_High, Year_Low, Month, Day, Hour, Minute, Second, msec_high, msec_low, Week (10 Bytes)<br>Week:<br>0x01 = Monday<br>0x02 = Tuesday<br>0x03 = Wednesday<br>0x04 = Thursday<br>0x05 = Friday<br>0x06 = Saturday<br>0x07 = Sunday | |

As shown in Table 4, if the code displayed in the fifth and sixth octets of the MS/TP header is one of 'C1' to 'C4', a frame containing the corresponding MS/TP header becomes a set frame 901 according to this embodiment.

The monitoring set data 902 contained in the set frame 901 of FIG. 9 contains information of the data field shown in Table 4. For example, if the fifth and sixth octets of the MS/TP header are 'C1' and '01' is set to the monitoring set data 902, the MS/TP monitoring node 10 is set to 19200 bps.

The communication speed setting of Table 4 is a setting related to a speed of the monitoring node 10. In addition, the MS/TP frame filter setting of Table 4, which is a setting related to filtering functions performed in the MS/TP monitoring node 10, can be set to filter or not to filter an MS/TP frame of a specific MS/TP frame type. In addition, setting an operation mode of the monitoring node of Table 4 is a setting for determining a back door for debugging the MS/TP monitoring node 10, activating communication of a specific layer (e.g., data link layer or application layer), or performing a reset. In addition, the time synchronization setting of Table 4 is setting data used for time synchronization between the monitoring module 30 and the MS/TP monitoring node 10.

Since specific numbers or configuration of data fields of Table 4 can be separately modified, the present invention is not limited by the specific data values of Table 4.

The communication network analysis apparatus according to the present invention is advantageous in that a bidirectional monitoring function is provided to perform a variety of interoperability tests.

Furthermore, if the communication network analysis apparatus according to the present invention is applied to the BACnet specification, a bidirectional communication function, a message filtering function, and an MS/TP communication network analysis function can be provided in developing and testing building automation and control apparatus based on the BACnet MS/TP protocol and performing interoperability tests using BACnet VTS. Therefore, it is advantageous in that convenience of developers and testers is significantly increased, and developing and testing time can be reduced.

It will be apparent to those skilled in the art that the present invention can be implemented into various specific forms without departing from the spirit and essential features of the present invention. Therefore, the above descriptions must not be interpreted limitedly in all aspects, but should be considered to be for illustrative purposes. The true scope of the present invention should be defined by the reasonable interpretation of the claims, and all the modifications within the equivalent scope of the present invention are included in the scope of the present invention.

What is claimed is:

1. A BACnet MS/TP communication network analysis system including at least one BACnet MS/TP node connected to a BACnet MS/TP communication network and a BACnet visual test shell (VTS) for monitoring the BACnet MS/TP communication network, the system comprising:

a monitoring node for performing a first filtering on a frame received from the BACnet MS/TP communication network, configuring a monitoring frame by adding a monitoring frame header to the frame on which the first filtering is performed, and transmitting a frame corresponding to a message created in the BACnet VTS to the BACnet MS/TP communication network; and a monitoring module for receiving the monitoring frame from the monitoring node, performing a second filtering on the received monitoring frame, outputting a result of the second filtering, transmitting a part of the monitoring frame on which the second filtering is performed to the BACnet VTS, receiving a message from the BACnet VTS, determining a destination address of the BACnet MS/TP communication network to which the received message is transferred, configuring an MS/TP frame based on the received message and the destination address, and transmitting the configured MS/TP frame to the monitoring node.

2. The system as claimed in claim 1, wherein the monitoring node is connected to the monitoring module through an interface of a full-duplex mode.

3. The system as claimed in claim 1, wherein the first filtering is performed in accordance with a type of the frame received from the BACnet MS/TP communication network.

4. The system as claimed in claim 1, wherein the second filtering is performed in accordance with a network protocol data unit (NPDU) of the received monitoring frame.

5. The system as claimed in claim 1, wherein the part of the monitoring frame transmitted to the BACnet VTS is an NPDU contained in the monitoring frame on which the second filtering is performed.

6. The system as claimed in claim 1, wherein when the frame corresponding to the message created in the BACnet VTS is transmitted to the BACnet MS/TP communication network, the monitoring node receives the token from the BACnet MS/TP communication network and operates as a master node.

7. The system as claimed in claim 1, wherein the monitoring module transmits monitoring set data for controlling settings of the monitoring node.

8. The system as claimed in claim 7, wherein a header of a frame containing the monitoring set data includes a code for identifying the monitoring set data.

9. The system as claimed in claim 7, wherein the monitoring set data is information on configuration of a communication speed, a frame filter, operating mode and time synchronization of monitoring node.

10. A communication network analysis system including at least one data link layer node connected to a token-passing based communication network and a visual test shell (VTS) for monitoring the token-passing based communication network, the system comprising:

a monitoring node for performing bidirectional communication with the communication network in the unit of a frame containing a protocol data unit (PDU) used in an upper layer including a network layer and a header used in a data link layer, performing a first filtering on a frame received from the communication network, configuring a monitoring frame by inserting information on a time on which the frame is received, and transmitting a frame corresponding to a message created by the VTS to the communication network; and a monitoring module for receiving the monitoring frame from the monitoring node, performing a second filtering on the received monitoring frame, transmitting a part of the monitoring frame on which the second filtering is performed to the VTS, configuring a frame including a PDU contained in a message received from the VTS and a header to which a destination address to which the received PDU is transmitted is added, and transmitting the configured frame to the monitoring node.

11. The system as claimed in claim 10, wherein the information on a time on which the frame is received is stored in a monitoring frame header inserted into the monitoring frame.

12. The system as claimed in claim 10, wherein the monitoring node is connected to the monitoring module through an interface of a full-duplex mode.

13. The system as claimed in claim 10, wherein the first filtering is performed in the data link layer.

14. The system as claimed in claim 10, wherein the first filtering is performed in accordance with a type of the frame received from the communication network.

15. The system as claimed in claim 10, wherein the second filtering is performed in the upper layer.

16. The system as claimed in claim 10, wherein the second filtering is performed in accordance with an application protocol data unit (APDU) and an application service of the received monitoring frame.

17. The system as claimed in claim 10, wherein the destination address is an address of the data link layer.

18. The system as claimed in claim 10, wherein the monitoring module transmits monitoring set data for controlling settings of the monitoring node.

19. The system as claimed in claim 18, wherein the monitoring set data is transmitted together with a frame header of the data link layer.

* * * * *